United States Patent

Ettischer

[15] 3,677,156

[45] July 18, 1972

[54] SIMPLIFIED SYNCHRONIZING MECHANISM FOR CAMERAS ADAPTED TO USE MECHANICALLY FIRED FLASH LAMPS

[72] Inventor: Helmut Ettischer, Stuttgart-Wangen, Germany

[73] Assignee: Eastman Kodak Company, Rochester, N.Y.

[22] Filed: Aug. 19, 1970

[21] Appl. No.: 65,035

[30] Foreign Application Priority Data

Aug. 23, 1969 Germany .......................... P 19 43 054.7

[52] U.S. Cl. .................... 95/11.5 R, 95/11 L, 240/1.3, 431/93
[51] Int. Cl. ........................................ G03b 15/04
[58] Field of Search ................ 95/11.5, 11 L; 240/1.3; 431/92, 93

[56] References Cited

UNITED STATES PATENTS 3,576,156   4/1971   Michatek ........................... 95/11.5

*Primary Examiner*—Samuel S. Matthews
*Assistant Examiner*—Robert P. Greiner
*Attorney*—Robert W. Hampton and Leonard W. Treash, Jr.

[57] ABSTRACT

A photographic camera is provided with a simplified flash synchronizing mechanism utilizing a flash control lever which is positioned to be operative only when a flash unit is mounted. For natural light photography, shutter driver release is controlled solely by a latch arm which is an element of the camera release. With a flash unit mounted, the flash control lever is moved to an operative position where it is actuated through a linkage with the camera release and serves both as a final latch releasing the shutter driver and as a connecting link transmitting actuating force to the flash unit. Since both shutter and flash actuation are effected through a single operative motion of the flash control lever, synchronized operation is achieved.

2 Claims, 4 Drawing Figures

Patented July 18, 1972

HELMUT ETTISCHER
INVENTOR

BY Leonard W. Treash, Jr.
Robert W. Hampton

ATTORNEYS

Patented July 18, 1972   3,677,156

HELMUT ETTISCHER
INVENTOR

BY *Leonard W. Creasy*
*Robert W. Hampton*

ATTORNEYS

SIMPLIFIED SYNCHRONIZING MECHANISM FOR CAMERAS ADAPTED TO USE MECHANICALLY FIRED FLASH LAMPS

CROSS-REFERENCE TO RELATED APPLICATION

Reference is made to commonly assigned U.S. application Ser. No. 765,926 entitled "Percussion Activatable Flash Units Having Individual Striker Elements and Photographic Apparatus for Using Such Units" filed Oct. 8, 1968, and now U.S. Pat. No. 3,576,155 in the name of David E. Beach and copending U.S. application Ser. No. 10,068 filed Feb. 12, 1970, entitled PHOTOGRAPHIC APPARATUS, David N. Brooks.

BACKGROUND OF THE INVENTION

1. Field of the Invention

The present invention relates to photographic cameras and camera mechanisms useable with mechanically ignitable flashlamps and more particularly to mechanisms for synchronizing shutter operation with the actuation of mechanically ignitable flashlamps, for example, percussively ignitable flash lamps.

2. Description of the Prior Art

It is well known in the photographic art to use electrically fired flash devices to supplement the natural light available for picture-taking. While electrically fired flash devices have provided generally satisfactory results it has proven difficult to design firing systems with continuing high reliability.

The batteries which typically serve as the power source in electrical flash firing systems deteriorate with age and use reducing their effectiveness in initiating the flash operation. The contact surfaces of the electrical circuit are subject to corrosion which further serves to render the firing system less dependable. The exasperating quality of a flash failure because of either or a combination of the above causes is accentuated when the failure occurs for a "once in a lifetime" picture taking opportunity. A user's satisfaction with his camera can seldom survive such an experience.

To obviate the need for electrical power sources and circuits and to provide for more dependable flash-photography percussively ignitable flashlamps have been developed.

One such lamp is disclosed in U.S. application Ser. No. 765,926 entitled PERCUSSION ACTIVATABLE FLASH UNITS HAVING INDIVIDUAL STRIKER ELEMENTS AND PHOTOGRAPHIC APPARATUS FOR USING SUCH UNITS filed Oct. 8, 1968, and now U.S. Patent No. 3,576,155 in the name of David E. Beach.

In this application a percussively ignitable flash lamp is disclosed as it can be assembled in a unit with a percussion striker which is held in a pre-energized condition by a latch member from which the striker is releasable to effect ignition of the lamp.

In U.S. Pat. No. 2,972,937 (Suits) it is suggested that a flash lamp can be ignited by piezoelectrical actuation, that is, by striking a piezoelectrical element located either in the camera or the flash lamp unit and electrically connected to the lamp.

To take advantage of the new flash units which are fireable by mechanical rather than electrical means, new camera mechanisms must be developed capable of providing the appropriate mechanical actuation in properly timed relationship to camera shutter operation.

In copending U.S. application Ser. No. 10,068, Brooks, there is disclosed a mechanism for firing a percussive lamp synchronously with shutter actuation by releasing a spring energized synchronizing member which both releases the shutter and fires the lamp. While effective, this mechanism requires both cocking of the shutter and the synchronizing member. For inexpensive camera lines it is essential that synchronizing mechanisms be of simple design to keep manufacturing costs low while still providing dependable operation.

SUMMARY OF THE INVENTION

It is an object of the present invention to provide mechanism for synchronizing flash and shutter operation which is simple, reliable and economical of manufacture.

It is a further object of the invention to provide a flash actuating mechanism which does not require energy storage devices or preliminary energy storage operations.

It is a still further object of the invention to provide a flash actuating mechanism directly linked to the camera release for providing positive flash operation.

The present invention provides a flash control member which is inactive for natural light camera operation and is positioned, in response to mounting of a flash unit, to be driven operatively through a linkage with the camera release thereby effecting synchronized shutter and flash operation.

One feature of the present invention is a simplified flash actuating mechanism which derives the necessary operating energy through direct linkage with the camera release member thus requiring no energy storage devices.

A further feature of the present invention is a dual purpose operation of a flash control lever in releasing a shutter driver and effecting actuation of a flash unit whereby synchronization of shutter and flash operation is conveniently and reliably accomplished.

BRIEF DESCRIPTION OF THE DRAWINGS

In the detailed description of the presently preferred embodiment of the invention presented below, reference is made to the accompanying drawings.

DESCRIPTION OF THE PREFERRED EMBODIMENT

Because photographic cameras are well known, the present description will be directed in particular to elements forming part of, or cooperating more directly with, the present invention, camera elements not specifically shown or described herein being understood to be selectable from those known in the art.

Figure 1:
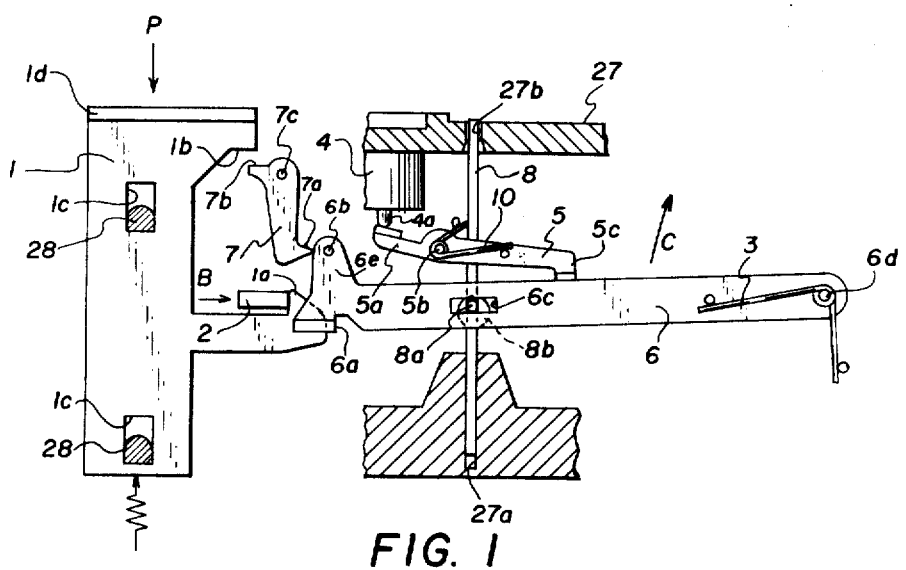
FIG. 1 is a front elevational view of the photographic camera with portions removed to illustrate the present invention more clearly. The camera elements are shown in their positions prior to operation for the condition where no flash unit is mounted.

Referring to FIG. 1 a camera including the presently preferred embodiment of the invention is shown cocked and ready-to- operate for the condition wherein a flash unit is not mounted. A depressable camera release 1 is slidably mounted on a camera body 27 by means of pins 28 located in slots 1c and is spring biased to the position shown in FIG. 1. The camera operator's actuating force is applied in a direction P to a pressure surface 1d which extends externally of camera body 27. Operator depression of camera release 1 is arrested when pins 28 engage the upper end of slots 1c. Camera release 1 additionally includes a driver arm 1b and a latch arm 1a which latch arm releasably restrains a pre-energized shutter driver 2 in the cocked position as illustrated in FIG. 1. Shutter driver 2 is biased to move in a direction B to impact and thereby actuate a shutter (not shown) in a manner well known in the photographic art.

A flash control lever 6 is pivotally mounted on camera body 27 by means of a pin 6d and extends substantially horizontally toward the camera release. A relatively weak spring 3 urges flash control lever 6 to rock in the clockwise direction. Flash control lever 6 includes a horizontally elongated slot 6c, a pin tab 6e, a lifting pin 6b and a latch flange 6a. Lifting pin 6b is located on pin tab 6e and extends substantially perpendicularly to the plane of rotation or operative plane of flash control lever 6. A lifting lever 7 is pivotally mounted on camera body 27 by means of a pin 7c and is disposed with a force transfer tab 7b in the operative path of driver arm 1b of camera release 1 as illustrated in FIGS. 1 and 2.

A hooking or lifting finger 7a is included at one end of lifting lever 7. Rocking of lifting lever 7 causes lifting finger 7a to travel in a hooking movement indicated by a broken line in FIGS. 1 and 2. Lifting finger 7a is disposed to hook lifting pin 6b during a hooking movement with flash control lever 6 in the pre-flash position as illustrated in FIG. 2 and to pass above lifting pin 6b during a hooking movement with flash control lever 6 in the no-flash position as illustrated in FIG. 1.

Figure 2:
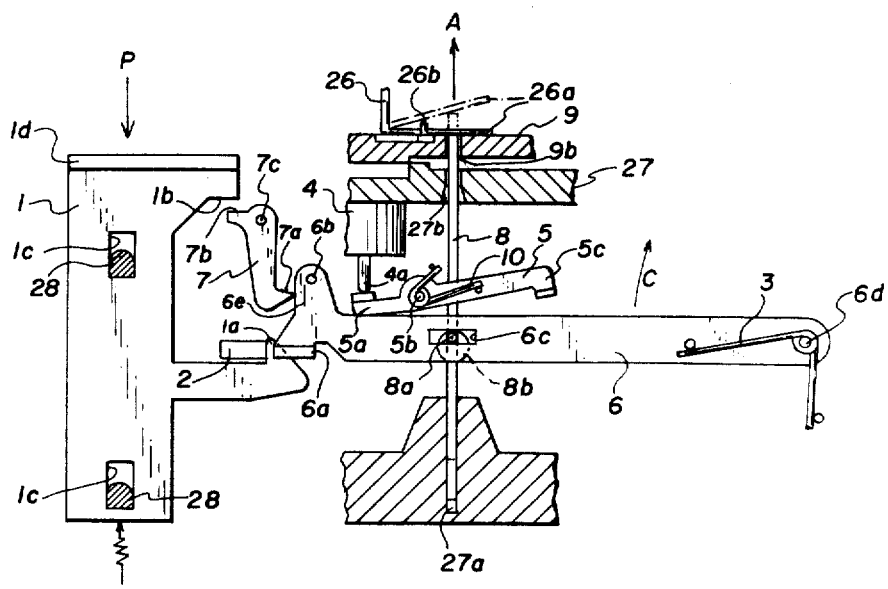
FIG. 2 corresponds to FIG. 1 but for the condition where a flash unit is mounted on the camera.

Latch flange 6a extends substantially perpendicularly to the operative plane of flash control lever 6 and for the pre-flash position shown in FIG. 2 obstructs the operative path of shutter driver 2. For the no-flash condition shown in FIG. 1, latch flange 6a is disposed below the operative path of shutter driver 2 and does not serve to restrain shutter driver 2.

An ignition bar 8 is mounted for movement in a substantially vertical path defined by a channel 27a and an aperture 27b of camera body 27. A pin 8a is rigidly affixed to ignition bar 8 and is disposed in elongated slot 6c to translate rocking movement of flash control lever 6 into longitudinal movement of ignition bar 8.

A flash unit receptacle 4 is securely mounted to camera body 27 for releasably receiving a mechanically actuable flash unit. Cooperating receptacle and flash unit may be of various forms known in the art. Receptacle 4 includes a slidably mounted pin 4a which is movable between an upper and lower limit.

Figure 3:
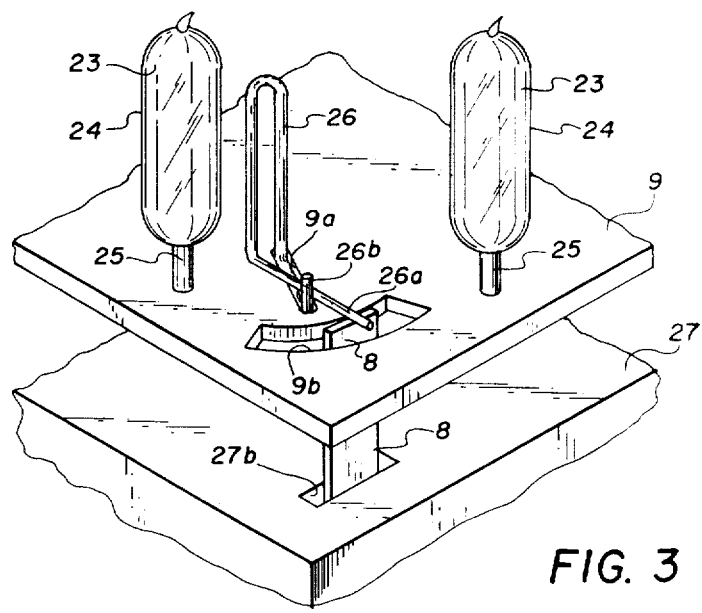
FIGS. 3 and 4 are perspective views of flash units usable with the invention with portions removed for clarity of illustration.
Figure 4:
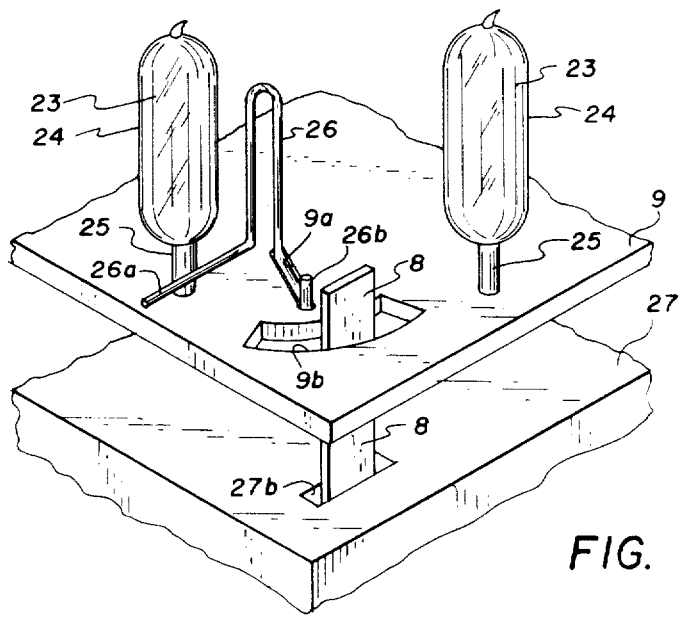

Referring now to FIGS. 3 and 4, a flash unit usable with a camera constructed according to the invention includes a base 9 holding a plurality of lamps 24, each lamp including an envelope 23 enclosing combustible material detonatable by percussive contact with a primer 25 disposed below the lamp. A torsion spring 26 includes a striking end 26a which is latched by a latching end 26b in a pre-energized condition. The latching end 26b is held in a groove 9a in the base 9. The spring 26 is shown in the energized stage latched by latching end 26b in FIG. 3. In FIG. 4 the ignition bar 8 has entered the flash unit through an access opening 9b in the flash unit base 9 to dislodge the striking end 26a allowing it to swing under torsional restoring force into percussive contact with primer 25 thereby firing the lamp.

With a flash unit mounted the flash unit base 9 is disposed in receptacle 4 and displaces pin 4a to a lowered position. Receptacle 4 is oriented to position access opening 9b of a mounted flash unit above aperture 27b thereby permitting entry into the flash unit by ignition bar 8 as described above.

Referring to FIGS. 1 and 2, a holding lever 5 is pivotally mounted to camera body 27 by a pin 5b and is urged by a relatively strong spring 10 to rock in the clockwise direction. End 5a of holding lever 5 is disposed to engage pin 4a of receptacle 4 and with no flash mounted movement under the urging of relatively strong spring 10 is arrested when the upper travel limit of pin 4a is reached (illustrated in FIG. 1). For this condition an end 5c of holding lever 5 biases flash control lever 6 to the no flash position illustrated in FIG. 1 against the opposing clockwise urging of relatively weak spring 3.

With a flash unit mounted pin 4a is displaced to the lowered position illustrated in FIG. 2 and drives holding lever 5 against the urging of spring 10 to a flash position wherein end 5c is withdrawn from flash control lever 6. Flash control lever 6 for this condition is free to rock under the urging of spring 3 and moves in a clockwise direction causing ignition bar 8 to move upwardly. The upward movement of ignition bar 8 is arrested by striker end 26a which is not impacted with sufficient force to be dislodged.

With ignition bar 8 resting against striker 26a, pin 8a acting in slot 6c holds flash control lever 6 in the pre-flash position discussed supra and illustrated in FIG. 2. An adjustable eccentric 8b can be used as part of the mount for pin 8a to provide a factory adjustment for the operative position of ignition bar 8.

Referring to FIG. 1 operation of the presently preferred embodiment without a flash unit mounted is first described. The operator depresses camera release 1 by applying a force in direction P to pressure surface 1d. Latch arm 1a is carried downwardly by camera release 1 to release pre-energized shutter driver 2 for operative movement. With flash control lever 6 in the no-flash position shutter driver 2 is not obstructed and shutter operation is effected. Driver arm 1b is also carried downwardly by camera release 1 to displace force transfer tab 7b causing lifting lever 7 to rock in the counterclockwise direction. With flash control lever 6 in the no-flash position the motion of the lifting lever 7 is not coupled to other portions of the camera mechanism.

Referring to FIG. 2 operation of the presently preferred embodiment with a flash unit mounted is now described. The operator depresses camera release 1 to release shutter driver 2 from latch arm 1a as for operation without a flash unit mounted. For flash operation, however, latch flash control lever 6 is in the pre-flash position and latch flange 16a obstructs operative motion of shutter driver 2. Driving arm 1b engages and displaces force transfer tab 7b to rock lifting lever 7 and causes lifting finger 7a to travel in a hooking movement. With flash control lever 6 in the pre-flash position lifting pin 6b is hooked by lifting finger 7a and subsequent rocking of lifting lever 7 raises lifting pin 6b thereby causing flash control lever 6 to rock operatively in the clockwise direction. Operative rocking of flash control lever 6 carries latch flange 6a above shutter driver 2 which is thereby released and operates the camera shutter. The same operative motion of flash control lever 6 is transmitted to ignition bar 8 which is driven upwardly dislodging striking end 26a thereby actuating the flash unit. Since both flash unit and shutter operation are effected by the same rapid motion of flash control lever 6 synchronism is achieved.

The invention has been described in detail with particular reference to a preferred embodiment thereof, but it will be understood that variations and modifications can be effected within the spirit and scope of the invention.

We claim:

1. In a camera having means for receiving a flash unit having at least one lamp ignitable by striking and a pre-energized striker releasable by application of mechanical force to effect striking of said lamp;

an ignition member movable from a first position to a second position to release a pre-energized striker in a received flash unit to effect firing of its associated lamp;

a shutter driver movable from an energized position to a deenergized position to effect an exposure;

a camera release depressable by the camera operator; and latch means movable with said camera release for releasing said shutter driver from its energized position;

the improvement comprising:

a. a flash control member movable between at least first, second and third positions, said flash control member including:

1. means engageable with said ignition member for moving said ignition member from its first to its second position in response to movement of said flash control member from its second to its third position, 2. latch means movable with said control member from a position out of engagement with said shutter driver when said control member is in its first position to a position for engaging said shutter driver when said control member is in said second position to a position for releasing said shutter driver during movement of said control member from its second position to its third position, b. means responsive to depression of said camera release for moving said control member from said second to said third position; and c. means responsive to insertion of a flash unit in said receiving means for movement of said control member from said first position to said second position.

2. In a camera having
means for receiving a flash unit having at least one lamp ignitable by striking and a pre-energized striker releasable to effect such striking;
an ignition member movable from a first position to a second position to release a pre-energized striker in a received flash unit;
a shutter driver movable from an energized position to a de-energized position to effect an exposure; and
a camera release depressable by the camera operator;
the improvement comprising:
a. a flash control member movable from a first position to a second position, said control member including:
1. latch means for releasably retaining said shutter driver in its energized position when said flash control member is in its first position and for releasing said shutter driver during movement of said flash control member from its first position to its second position,
2. means engageable with said ignition member for moving said ignition member from its first to its second position in response to movement of said control member from its first position to its second position to effect firing of a lamp of a received unit;
b. means for translating motion of said camera release to said flash control member to move said flash control member from said first position to said second position solely from the force applied in depressing said camera release.

* * * * *